Nov. 9, 1937.    F. A. DEUTSCH    2,098,415
FLUID SHOCK ABSORBER
Filed April 18, 1934    2 Sheets-Sheet 1

Inventor:
FRITZ ALBERT DEUTSCH
his Atty.

Patented Nov. 9, 1937

2,098,415

UNITED STATES PATENT OFFICE 2,098,415

FLUID SHOCK ABSORBER

Fritz Albert Deutsch, Berlin, Germany, assignor to Francisco Liebhold, Brussels, Belgium Application April 18, 1934, Serial No. 721,123
In Germany September 6, 1932

2 Claims. (Cl. 267—8)

My invention relates to a shock absorber and more particularly to a fluid shock absorber.

One of the objects of my invention is to provide a shock absorber, which has a simple, compact and economical construction.

Another object of my invention is to provide a shock absorber, in which the actuating means engaging the dampening piston is arranged within the profile of the shaft and consists of a separate part, so that it is not necessary to harden the entire shaft.

In order to carry out my invention into practice, I provide a fluid shock absorber comprising a housing, fluid operating dampening means arranged in said housing, a shaft journaled in said housing and provided with at least one depression and at least one cylindrical pin disposed within said depression to engage said dampening means.

Figure 3:
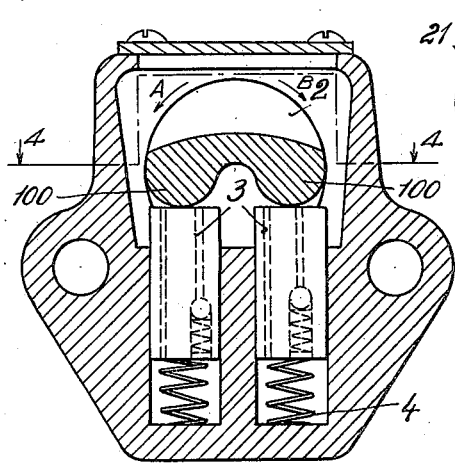
Figure 1:
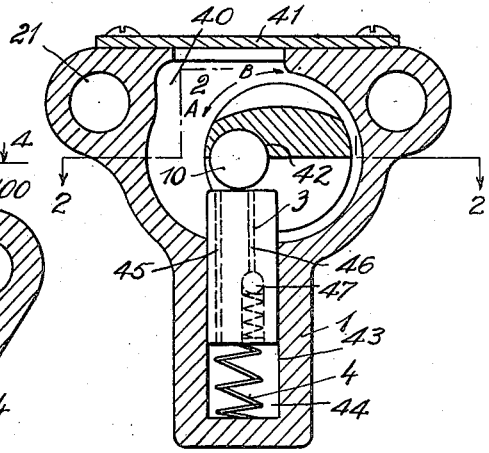
Figure 4:
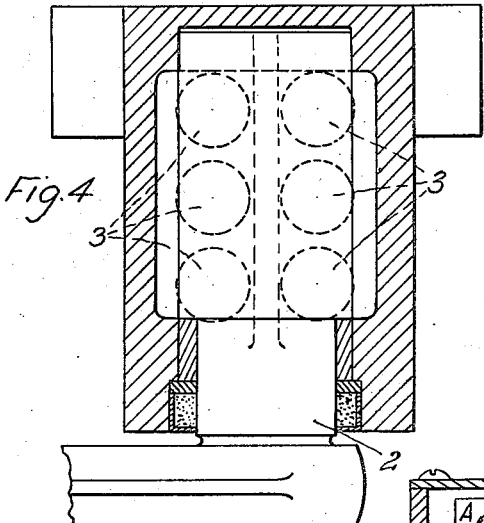
Figure 2:
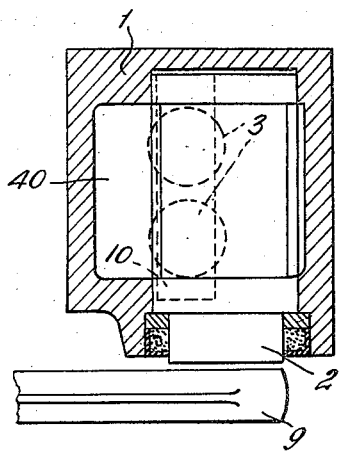
Figure 6:
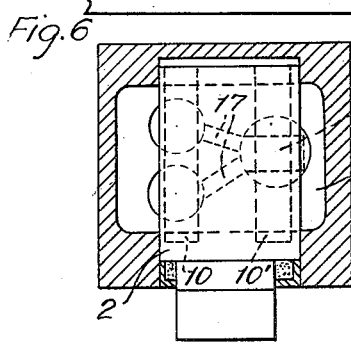
Figure 5:
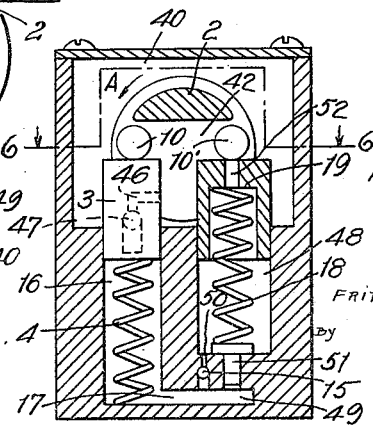
Figure 5A:
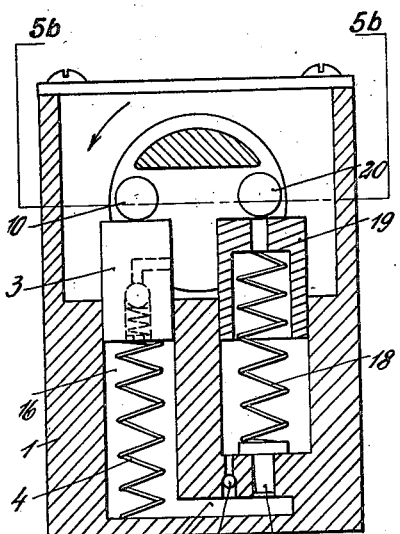
Figure 5B:
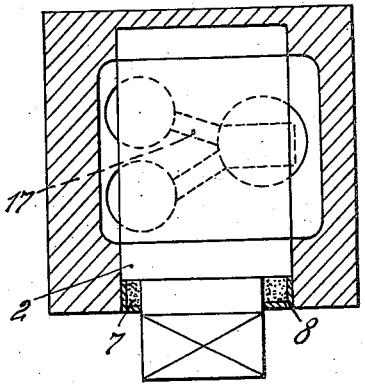

I accomplish the objects of my invention by means of the combination and arrangement of parts described in the following specification, set forth in the appended claims and illustratively exemplified in the accompanying drawings, in which Fig. 1 shows a vertical sectional view of a shock absorber, the piston of which is actuated by a pin disposed within a depression of the actuating shaft, Fig. 2 is a horizontal sectional view of the shock absorber shown in Fig. 1, taken on lines 2—2, Fig. 3 illustrates a vertical sectional view of another embodiment of a shock absorber, the pistons of which are actuated by cams being integral with the actuating shaft and disposed within the profile thereof, Fig. 4 is a horizontal sectional view of the shock absorber shown in Fig. 3, taken on lines 4—4, Fig. 5 is a vertical sectional view of still another embodiment of a shock absorber which is provided with an auxiliary regulating means to control the dampening effect, whereby the dampening piston as well as the piston of the auxiliary regulating means are actuated by pins disposed within a depression of the actuating shaft, and Fig. 6 is a horizontal sectional view of the shock absorber in Fig. 5, taken on lines 6—6.

Referring now to Figs. 1 and 2, I designates the housing of the shock absorber, which is provided with a refilling chamber 40 in its upper part. Said refilling chamber is closed by a cover 41. An actuating shaft 2 journaled in the housing I extends through said refilling chamber. One end of a lever 9 is fixedly keyed to the free end of the shaft 2, which projects from the housing. The other end (not shown) of the lever 9 is connected to the wheel axle of the vehicle to transmit the upwards and downwards movements of the wheel axle into oscillating movements of the actuating shaft 2 in the direction of the arrows A and B. The shaft 2 has a depression or recess 42, in which a pin 10 is disposed. The pin 10 is arranged within the profile of the shaft 2, so that the opening through which the shaft is inserted into the housing must not be of a larger diameter than the shaft and the shock absorber may be of a compact form. This in turn reduces the weight of the shock absorber to a great extent. The pin 10 may be of a material different from the material of the shaft and may be produced of hardened steel, for example. It is not necessary to burden the entire shaft. The lower part of the housing is provided with a series of two bores, so that the cylindrical members 43 of the dampening mechanism are formed. Said cylindrical members 43 receive the two pistons 3 movable in said bores. Working chambers 44 are formed between the lower end of each piston 3 and the bottom of each bore of the cylindrical member 43. A spring 4 is arranged in the working chamber 44 between the bottom of the cylinder and the piston and tends to urge the latter against the pin 10. Two channels 45 and 46 extend throughout the length of each piston 3 and are adapted to communicate the refilling chamber 40 with the working chamber 44. A spring pressed check valve 47 is arranged in the channel 46.

The shock absorber operates as follows:—

If the lever 9 rotates the shaft 2 in the direction of the arrow A, the pin 10 presses the piston 3 downwards against the action of the spring 4. The liquid being in the working chamber 44 is forced to pass through the small channel 45 into the refilling chamber thus producing the dampening effect. The liquid cannot flow through the channel 46, as the latter is closed by the check valve 47 during the downward movement of the piston 3. If, however, after the above described dampening action the lever 9 rotates the shaft 2 in the direction B, the spring 4 urges the piston 3 to follow the pin 10 and to move upwardly. At this moment the check valve 47 opens and permits the entrance of fluid from the refilling chamber 40 into the working chamber 44 through the channel 46 in addition to the fluid passing through the channel 45.

The shock absorber shown in Figs. 3 and 4 has two series of pistons 3, one series at each side of the middle of the shock absorber. Accordingly, the shaft 2 is provided with two cams 100 and 100', which actuate the two series of pistons. While according to Fig. 1 the actuating means consists of a pin disposed within a depression of the shaft, the cams 100, 100' of the shock absorber according to Fig. 3 are integral with the shaft 2 and may be produced by a suitable milling of the shaft for example. Similar to the pin 10, the cams 100, 100' are within the profile of the shaft 2, so that the shock absorber according to Fig. 3 has the same advantage as the shock absorber shown in Fig. 1. The arrangement of two series of pistons results in a shock absorber, which has a dampening effect in two directions. While the shock absorber according to Fig. 1 has a dampening effect only in one direction during the rotation of the shaft 2 in the direction of the arrow A, the shock absorber shown in Fig. 3 dampens in both directions, i. e. if the shaft 2 is rotated in the direction of the arrow A or B, as either the left hand or the right hand series of pistons causes the retarding effect. It is obvious that pins inserted in the shaft may be used instead of the cams being integral with the shaft.

Figs. 5 and 6 show the use of an actuating shaft 2 with pins 10 and 10' disposed within its depression 42 and its profile for a shock absorber, which is provided with an auxiliary means to control the dampening effect. The left hand pin 10 contacts with the series of two pistons 3, which act as dampening means as the piston 3 of the other embodiments. The pistons 3 are provided with only one channel 46, in which a check valve 47 is arranged. The right hand pin 10' contacts with a regulating piston 19 movably arranged in a bore 48. Each of the bores 16, receiving the pistons 3 opens in a channel 17, and both channels 17 communicate with a chamber 49. Two ducts 50 and 51 communicate the chamber 49 with the bore 48. A check valve 15 is arranged in the duct 50, and a valve 14 is arranged in the duct 51. One end of a spring 18 bears against said valve 51, the other end of the spring 18 bears against the inside of the hollow piston 19 and urges the latter against the pin 10'. The regulating piston 19 has a passage 52, through which the bore 48 communicates with the refilling chamber 49.

The shock absorber according to Figs. 5 and 6 operates as follows:—

If the shaft 2 is rotated in the direction of the arrow A, the pin 10 pushes the dampening pistons 3 downward. The pistons displace the liquid in the bores 16, and the displaced liquid tends to open the spring loaded valve 14. On the other hand, said rotation of the shaft 2 results at the same time in an upward movement of the regulating piston 19 following the pin 10. Thus the regulating spring 18 is elongated during the dampening action of the device, i. e. during the downward movement of the pistons 3. Said elongation of the spring 18 results in a decreasing of the tension thereof, so that the loading of the valve is less at the end of the stroke of the pistons 3 than at the beginning. In other words, the dampening action decreases automatically with the progressive working stroke of the pistons 3. This permits the accommodation of the dampening effect to the characteristic of the spring. The passage 52 serves to regulate the amount of fluid in the regulating bore 48.

I have shown preferred embodiments of my invention, but it is clear that numerous changes and omissions may be made without departing from the spirit of my invention.

I claim:

1. In a fluid shock absorber, the combination of a housing having a refilling chamber, a shaft journaled in said housing and provided with at least one depression and at least one cylindrical pin disposed within said depression, a dampening mechanism arranged in said housing, said dampening mechanism substantially comprising cylinder and piston members movable against each other and internally forming a working chamber and a spring arranged between said cylinder and piston members and adapted to urge one of said members against said pin, at least one channel leading from said working chamber to said refilling chamber, and regulating means disposed in said channel and adapted to control the retarding effect of said dampening mechanism.

2. In a fluid shock absorber, the combination of a housing, fluid operating dampening means arranged in said housing, a shaft journaled in said housing and provided with at least one depression and at least one cylindrical pin disposed within said depression to engage said dampening means.

FRITZ ALBERT DEUTSCH.